(No Model.)

I. L. PURDY.
SCALE BEAM AND WEIGHT THEREFOR.

No. 429,477. Patented June 3, 1890.

Witnesses
E. L. Smith
Thomas Durant

Inventor
Ira L. Purdy.
By his Attorneys
Church & Church

UNITED STATES PATENT OFFICE.

IRA L. PURDY, OF MACEDON, NEW YORK, ASSIGNOR TO HANNAH H. PURDY, OF SAME PLACE.

SCALE-BEAM AND WEIGHT THEREFOR.

SPECIFICATION forming part of Letters Patent No. 429,477, dated June 3, 1890.

Application filed February 27, 1890. Serial No. 341,976. (No model.)

*To all whom it may concern:*

Be it known that I, IRA L. PURDY, of Macedon, Wayne county, and State of New York, have invented certain new and useful Improvements in Scales; and I do hereby declare the following to be a full, clear, and exact description of the same, reference being had to the accompanying drawings, forming a part of this specification, and to the letters of reference marked thereon.

My present invention relates to weighing-scales, and has for its object to provide means whereby a person can determine the position and movement of the sliding counter weight or balance on the scale-beam, and thereby position the weight to weigh the amount desired, even though he cannot see the lines or subdivisions indicating the different amounts. This is particularly desirable in dimly-lighted stores or when the salesman for any reason cannot readily see the marks on the beam.

Figure 1:
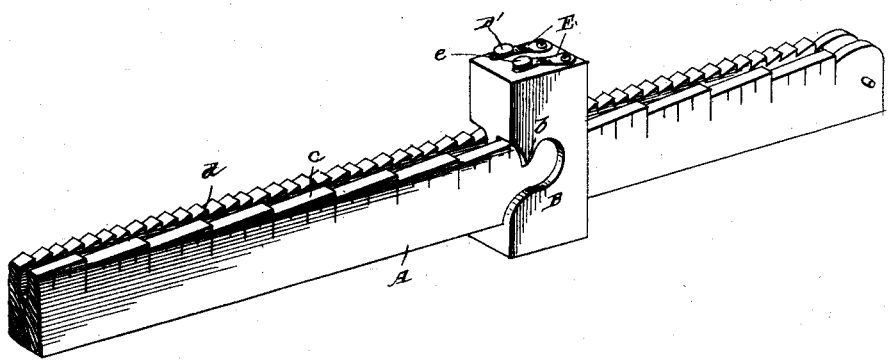
Figure 2:
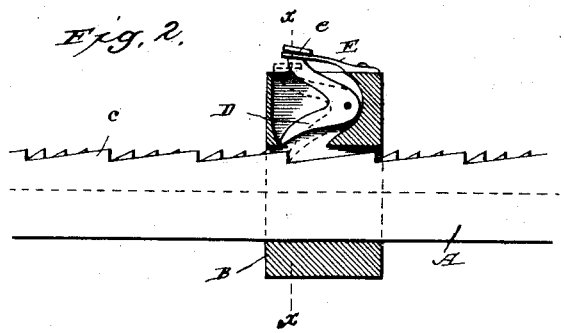
Figure 3:
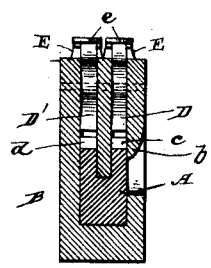

In the accompanying drawings, Figure 1 is a perspective view of a portion of a scale-beam, showing the application of my invention thereto; Fig. 2, a longitudinal sectional view through the counter-balance and beam; Fig. 3, a cross-sectional view on the line $x\,x$ of Fig. 2.

Similar letters of reference in the several figures indicate similar parts.

A indicates the beam of any suitable weighing apparatus, platform, or ordinary balance-scales, upon which the balance-weight B is adjusted by hand or otherwise, said beam being provided with suitable marks indicating any standard of weight—as tons, pounds, or ounces—while upon the balance B is arranged an index $b$, adapted to co-operate with said marks, as usual. One side of the scale-beam— the upper in the present instance—is provided with a series of projections or ratchet-teeth $c$, preferably with their straight side toward the outer end of the beam, and arranged in proximity to these teeth is a dog or pawl D, preferably pivoted to the weight B and with its operating end normally held out of contact with the teeth by a spring E, (or a suitable counter-weight,) though capable of being moved into engagement with said teeth, when desired, by pressing on the upper outer end $e$.

The beam A is provided with a smooth surface upon its upper side, upon which the weight B normally slides, and in the present form of device I preferably locate this bearing-surface at the center of the beam and provide a series of teeth $d$ on the upper portion of the beam opposite the series $c$, the former representing fractions of the amounts indicated by the latter—as if the latter indicate pounds the series $d$ may indicate halves, quarters, or ounces, the units being immaterial—and upon the weight over this latter series of teeth is arranged a pawl or dog D', similar to the pawl D, adapted to co-operate with it when depressed against its spring.

The ends of the pawls or dogs are arranged just over the index $b$, so that when the index points to one of the marks on the beam the dog, if depressed, would strike the bottom of the recess, just escaping the end of the tooth $c$.

The operation will now be readily understood. The operator, if he can readily see the indications on the scale, moves the weight B on the beam and ascertains the weight of the article by means of the index, as usual; but if he cannot clearly see he presses down one of the dogs and moves the weight along, counting the clicks made as the dog drops from the top of the tooth, or else ascertaining by feeling the movement of the dog. By first moving the dog D down into engagement and sliding the weight he can move it to the number of pounds or units desired, and then pressing the dog D' down he can in the same manner ascertain when the weight is in the correct position to indicate pounds and fractions thereof.

The object in having a plurality of pawls or dogs is to obviate the necessity of counting a large number of clicks or other indications if desired to start the weight from the end of the scale-beam. If the operator can see only indistinctly, he can approximate the position of the weight, and then can by moving it ascertain its correct position, moving it back, if necessary, until the weight is held by the end of the dog coming in contact with the straight side of the tooth.

By forming the teeth with one side inclined and the other substantially straight the movement of the pawl is more clearly defined and the operator can more readily ascertain the position of the weight than if the sides of the projection had angles substantially the same.

I do not desire to be confined precisely to the construction herein described and shown, as numerous modifications could be made without departing from the spirit of my invention—as, for instance, the dogs could be located on the under side or on opposite sides of the weight, or they could be held out of contact with the beam by the weight instead of by a spring, the manner of pivoting them being different, or they could be mounted directly upon springs, if desired.

I claim as my invention—

1. The combination, with a scale-beam having a series of teeth or projections thereon, of a sliding weight having a dog or pawl normally held out of engagement, but adapted to be moved by hand into engagement with the teeth on the beam, substantially as described.

2. The combination, with a scale-beam having a series of teeth or projections thereon having one side substantially straight, of a sliding weight having a dog or pawl normally held out of engagement and adapted to be moved by hand into engagement with the teeth on the beam, substantially as described.

3. The combination, with a scale-beam having two series of teeth or projections thereon, the teeth of each series arranged different distances apart, of a sliding weight having two dogs or pawls, one for each series of teeth, normally held out of engagement, but adapted to be moved by hand to co-operate with the respective series, substantially as described.

IRA L. PURDY.

Witnesses:
FRED F. CHURCH,
S. E. TRUE.